US009418262B1

(12) United States Patent  
Gentile et al.

(10) Patent No.: US 9,418,262 B1  
(45) Date of Patent: Aug. 16, 2016

(54) METHOD TO DIFFERENTIATE RADIO FREQUENCY IDENTIFICATION TAGS FROM OTHER METAL OBJECTS

(71) Applicant: Vectare, LLC., Fairfax, VA (US)

(72) Inventors: Brian Gentile, Clarksville, MD (US); Marc Lovend, Laurel, MD (US); Benedict Joseph Nardi, Thurmont, MD (US); Leticia Overton, Eldersburg, MD (US); Barth Robins Pitchford, Fairfax, VA (US); Donald Stanford Pitchford, Fairfax, VA (US); John Hill Pitchford, Fairfax, VA (US); William Dudley Pitchford, Fairfax, VA (US); Robert Paul Simon, Fairfax, VA (US); Russel Stephen Smith, Boyds, MD (US); Gary Whipple, Columbia, MD (US)

(73) Assignee: VECTARE, INC., Fairfax, VA (US)

( * ) Notice: Subject to any disclaimer, the term of this patent is extended or adjusted under 35 U.S.C. 154(b) by 0 days.

(21) Appl. No.: 14/805,872

(22) Filed: Jul. 22, 2015

(51) Int. Cl.  
*G06K 7/08* (2006.01)  
*G06K 7/10* (2006.01)  
*G08B 29/18* (2006.01)

(52) U.S. Cl.  
CPC ........ *G06K 7/10198* (2013.01); *G06K 7/10465* (2013.01); *G08B 29/185* (2013.01)

(58) Field of Classification Search  
CPC ........... G06K 7/08; G06K 19/00; G06K 7/10; G06F 17/00  
USPC .............................. 235/451, 375, 487, 472.02  
See application file for complete search history.

(56) References Cited

U.S. PATENT DOCUMENTS

| | | | | |
|---|---|---|---|---|
| 2006/0187044 A1* | 8/2006 | Fabian | ..................... | A61B 5/06 340/572.1 |
| 2006/0258442 A1* | 11/2006 | Ryan | ...................... | G07F 17/32 463/29 |
| 2006/0265164 A1* | 11/2006 | Clark | ....................... | A61B 5/06 702/94 |
| 2011/0018689 A1* | 1/2011 | McAllister | ............ | B65C 9/1865 340/10.1 |
| 2013/0113647 A1* | 5/2013 | Sentelle | ................... | G01S 13/32 342/22 |
| 2015/0324681 A1* | 11/2015 | Mats | ................. | G06K 19/07754 235/492 |

* cited by examiner

*Primary Examiner* — Edwyn Labaze  
(74) *Attorney, Agent, or Firm* — The Marbury Law Group, PLLC

(57) ABSTRACT

Radio Frequency Identification (RFID) tags will be embedded into materials used to make various items (e.g., garments). Embedded RFID tags will be used to track the manufacturing process, inventory management and verify the authenticity of manufactured goods. RFID tags utilize a standard language (e.g., EPC Gen2 v2, etc.) that distinctly identifies the objects and manufacturers of the items the tags are embedded in. RFID tags also contain memory fields that can be written to from an RFID Interrogator. Containing electronic circuitry and an antenna, RFID tags will activate metal detectors, creating false alarms and neutralizing their usefulness. Techniques are provided for combining a metal detector and a RFID Reader in a single device to enable a security function for differentiating garments and/or accessories with an embedded RFID tag or standalone metal object. This invention applies to all metal detectors, x-ray, and millimeter scanners to include handheld, portable and standalone systems.

20 Claims, 8 Drawing Sheets

METHOD TO DIFFERENTIATE RADIO FREQUENCY IDENTIFICATION TAGS FROM OTHER METAL OBJECTS

BACKGROUND

Radio Frequency Identification (RFID) tags are widely-used in various industries for conveying information. For example, retailers often embed RFID technology such as RFID tags in apparel, that are used for managing inventory during the manufacturing process, transit, and inventory management. In addition, conventional identification badges or cards often include RFID tags that may transmit employee data for authorizing building access. Due to advances in manufacturing techniques and the adoption of new RFID communication protocols, certain types of RFID tags are becoming increasingly more sophisticated, contain more user available memory, and are physically small and inexpensive. RFID tags can now be easily and affordably placed within apparel, apparel accessories such as purses, books, passports, etc. Accordingly, the use of RFID tags within consumer items has dramatically increased and is expected to further grow in the future.

However, the expanded use of RFID tags may be problematic with respect to conventional security measures designed to detect metal objects, such as guns, knives, or electronic triggering devices. In particular, as RFID tags include metal components, such as antennas and electronic circuitry, metal detector systems will be inadvertently and unnecessarily triggered by the RFID tags instead of metal objects that actually pose a security threat. For instance, when going through a metal detector in an airport, a passenger may set off an alarm due to an RFID tag embedded in the label of his or her shirt. False alarms of current and future metal detection equipment as a result of RFID technology may render such systems ineffective, resulting in an increase in cost of security and cause unnecessary stress and wasted time for the involved parties.

SUMMARY

Various embodiments provide methods, devices, systems, and non-transitory process-readable storage media for reducing false alarms and improving metal object detection, such as used in security scanning systems, by integrating RFID reader and metal-detecting functionalities. In particular, a device (i.e., a metal-detecting Radio Frequency Identification (RFID) receiver device) may be configured to use RFID technology, such as antenna capable of receiving radio waves typically used by RFID tags (e.g., 13.56 MHz, 860-960 MHz, etc.), to address the emerging use of RFID tags that may render current metal detectors ineffective. For example, when configured to identify RFID messages from valid RFID tags, such a metal-detecting RFID receiver device may be configured to bypass sounding security alarms typically triggered due to the presence of metal objects (e.g., airport security metal detection, etc.). In various embodiments, such a metal-detecting RFID receiver device may be a metal detector device configured with RFID read capabilities or an RFID reader configured with metal-detecting capabilities based on an analysis of incoming radio waves related to nearby metal objects.

An embodiment method performed by a processor of a metal-detecting Radio Frequency Identification (RFID) receiver device may include operations for monitoring a radio frequency, determining whether there are one or more metal objects nearby using the monitored radio frequency, and determining whether the one or more metal objects are RFID tags or include at least one non-RFID tag based on RFID messages received on the monitored radio frequency in response to determining there are one or more metal objects nearby using the monitored radio frequency. In some embodiments, determining whether there are one or more metal objects nearby using the monitored radio frequency may include monitoring a phase relationship between a current and a voltage at an RFID antenna for the monitored radio frequency, and determining whether there is a phase shift that is greater than a predefined threshold for the monitored radio frequency based on the monitored phase relationship. In some embodiments, the monitored radio frequency may be within an ultra-high frequency (UHF) range of frequencies or a high-frequency (HF) range of frequencies.

In some embodiments, the method may further include presenting a first message via a display that the one or more metal objects have been cleared in response to determining the one or more metal objects are RFID tags based on the RFID messages received on the monitored radio frequency, and presenting a second message via the display that there is likely an anomaly to be investigated in response to determining the one or more metal objects includes the at least one non-RFID metal object based on the RFID messages received on the monitored radio frequency. In some embodiments, the anomaly may correspond to the at least one non-RFID metal object or errata.

In some embodiments, the method may further include transmitting an RFID message to cause nearby RFID tags to perform a write operation of data indicating that the nearby RFID tags have been cleared in response to determining the one or more metal objects are the RFID tags based on the RFID messages received on the monitored radio frequency, and transmitting a message to another device indicating that there is likely an anomaly to be investigated in response to determining the one or more metal objects includes at least one non-RFID metal object based on the RFID messages received on the monitored radio frequency. In some embodiments, the write operation of the data indicating the nearby RFID tags have been cleared may cause the nearby RFID tags to store in memory a security code that is transmitted by the nearby RFID reader for use in future security screening operations by the metal-detecting RFID receiver device. In some embodiments, the message may be transmitted to another device via a wireless communication protocol or using an Ethernet connection.

In some embodiments, the method may further include verifying an identifier from each of the received RFID messages, wherein the identifier is an Electronic Product Code (EPC) identifier. In some embodiments, verifying the identifier from each of the received RFID messages may include obtaining imagery of a person associated with a first RFID message from an imaging device, and comparing the identifier within the received first RFID message to the obtained imagery.

In some embodiments, the method may further include determining whether the one or more metal objects are detected using a conventional metal detector functionality, in which determining whether there are one or more metal objects nearby using the monitored radio frequency and may include determining whether there are one or more metal objects nearby using the monitored radio frequency in response to determining one or more metal objects are detected using the conventional metal detector functionality.

In some embodiments, the method may further include first measuring a phase perturbation response using the monitored frequency in response to determining one or more metal objects are detected using the conventional metal detector functionality, measuring a second phase perturbation response using a resonant frequency of RFID tags in response to determining one or more metal objects are detected using the conventional metal detector functionality, and determining whether there is likely a non-RFID metal object nearby based on whether a difference between the first phase perturbation response and the second phase perturbation response is significant. In some embodiments, the method may further include presenting a message via a display indicating that there is likely an anomaly to be investigated in response to determining the difference is not significant. In some embodiments, the method may further include determining whether the difference between the first phase perturbation response and the second phase perturbation response corresponds to a received valid RFID message in response to determining that the difference is significant.

In some embodiments, the metal-detecting RFID receiver device may be a metal detector device configured with RFID read capabilities or an RFID reader configured with metal-detecting capabilities.

Further embodiments include a computing device configured with processor-executable instructions for performing operations of the methods described above. Further embodiments include a non-transitory processor-readable medium on which is stored processor-executable instructions configured to cause a computing device to perform operations of the methods described above. Further embodiments include a communication system including a computing device configured with processor-executable instructions to perform operations of the methods described above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
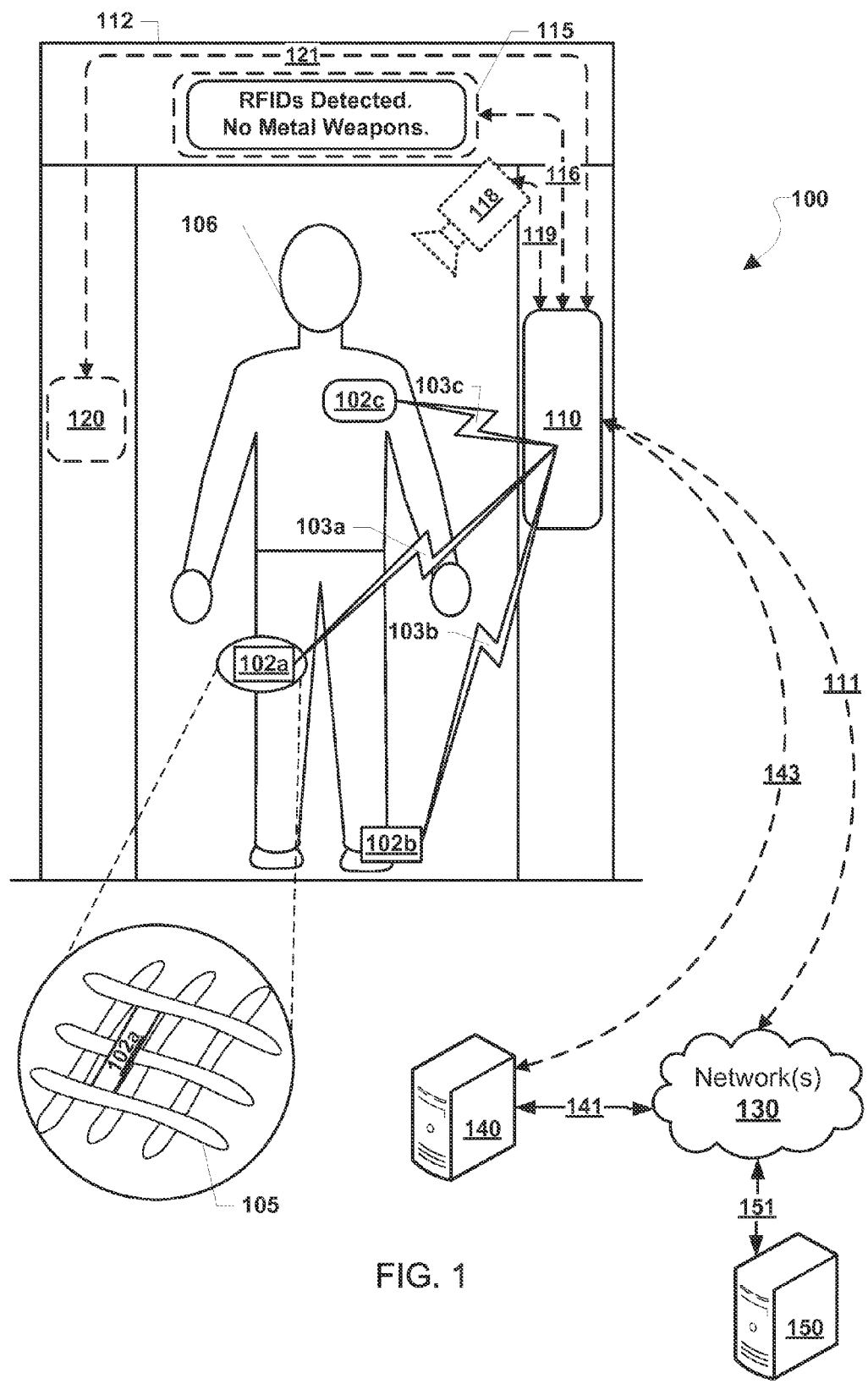
FIG. 1 is a component block diagram of a metal detector system including a metal-detecting RFID reader device and a plurality of RFID tags suitable for use in some embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The term "computing device" is used herein to refer to an electronic device equipped with at least a processor. Examples of computing devices may include mobile devices (e.g., cellular telephones, wearable devices, smart-phones, web-pads, tablet computers, Internet enabled cellular telephones, Wi-Fi® enabled electronic devices, personal data assistants (PDA's), laptop computers, RFID Readers, RFID Tags, etc.), personal computers, and server computing devices. In various embodiments, computing devices may be configured with memory or storage as well as networking capabilities, such as network transceiver(s) and antenna(s) configured to establish a wide area network (WAN) connection (e.g., a cellular network connection, etc.) and/or a local area network (LAN) connection (e.g., a wired/wireless connection to the Internet via a Wi-Fi® router, etc.).

The terms "Radio Frequency Identification (RFID) tag(s)" and "RFID tag(s)" are used herein to refer to electronic devices that are configured to transmit data in response to an interrogation message from an RFID reader or interrogator, and the terms "RFID reader(s)" and "RFID interrogator(s)" are used herein to refer to electronic devices that are configured to query and receive data from RFID tags. Typically, RFID tags may be considered "active" (i.e., including a power source) or "passive" (i.e., including no power source). For example, passive RFID tags may not include a battery and may only transmit data in response to receiving signals from a nearby RFID reader (or interrogator). Typically passive RFID tags are powered from the radio frequency signal from the RFID reader (or interrogator). Such RFID tags may utilize various radio frequencies for communications, such as frequencies within a high frequency (HF) band (e.g., 13.56 MHz) and frequencies within an ultra-high frequency (UHF) band (e.g., 860-960 MHz, etc.). Further, RFID tags may include memory (or memory fields) that may hold identification information that distinctly identifies objects associated with the RFID tags (e.g., type, class, manufacturer, etc.). Such identification information may be data utilizing a standard specification protocol, such as Electronic Produce Code (EPC) Gen2, EPC Gen2 Version 2, etc. The memory fields may be volatile and/or non-volatile memory and may be used for storing updated data (e.g., data updates based on messages or commands received from an RFID reader, etc.).

The terms "metal-detecting Radio Frequency Identification (RFID) receiver device" and "metal detector-equipped RFID receiver device" are used interchangeably herein to refer to a device configured to at least identify the presence of nearby metal objects as well as receive and process data from RFID tags. Metal-detecting RFID receiver devices may be considered RFID readers that include various functionalities for communicating and processing data, such as LAN interfaces and processing units for executing various software, routines, instructions, logic, etc. In some embodiments, metal-detecting RFID receiver devices may be coupled to or otherwise include 1) displays for outputting information, 2) input units for receiving data from users (e.g., cameras, keyboards, etc.), and/or 3) various other functionalities, such as for performing conventional or future metal detection. For example, the metal-detecting RFID receiver device 110 of FIG. 1 may be coupled to or otherwise connected to any manner of metal detector device, x-ray device, millimeter scanner, doorframe portal, or other similar devices or structures that may be handheld, portable, free-standing, permanently installed, and/or standalone systems. In various embodiments, metal-detecting RFID receiver devices may be configured to be independent of or included within various structures or devices, such as by being configured to be included within portable handheld devices, floor mats, doorframe-type structures, etc.

The terms "non-RFID metal object" and "non-RFID tag device" are used herein to refer to any metal object that is not configured with RFID functionalities. For example, a non-RFID metal object may be a gun, a knife, an electronic triggering device, a lump of metal, and/or any other item having metal and that does not utilize functionalities (e.g., electronic logic and an antenna) for exchanging identification data.

The ubiquity of RFID tags may enable improved inventory, tracking, and authentication management within various industries, particularly in consumer products including clothing. Real-time inventory management may be available to manufacturers, retailers, and other entities, providing data via RFID tags embedded in raw materials that indicate status throughout various stages of manufacturing, shipping, and retail (e.g., showcasing, purchase, returns, repairs, etc.). For example, by having RFID tags within reams of fabric, clothing businesses may track the fabric as it is cut and formed into garments, shipped from foreign sites to local sites, moved within warehouses/stores, placed on showroom floors, moved through a purchase scenario at a cash register, and/or returned to the store.

However, consumers of products that include these RFID tags may be inconvenienced by the proliferation of such RFID tags. In particular, as current and future metal detectors are used to secure more and more areas, such as banks, courthouses, airports, schools, sports venues, etc., consumers with RFID tags in their clothing, bags, and other items that are carried on their person may encounter many unnecessary delays. Security personnel may be required to spend exorbitant amounts of time to scan and clear people wearing clothing that includes RFID tags that trigger conventional metal detectors. It is the case that the data provided by the RFID tags themselves may be used to overcome such deficiencies in conventional metal detection systems.

The various embodiments provide methods, devices, systems, and non-transitory process-readable storage media for improving metal object detection within secure areas by integrating RFID reader and metal-detecting functionalities. A metal-detecting Radio Frequency Identification (RFID) receiver device may be configured to monitor antenna matching characteristics over various frequencies in order to collect information on nearby metal objects (e.g., RFID tags and non-RFID tags). Additionally the metal-detecting RFID receiver device may receive RFID messages from nearby RFID tags. The metal-detecting RFID receiver device may be a metal detector device configured with RFID read capabilities or an RFID reader configured with metal-detecting capabilities, and further may be a portable device or included within another device or structure (e.g., a screening portal, etc.).

By processing data from received RFID messages, the metal-detecting RFID receiver device may mitigate metal detector issues by distinguishing between metal objects that may actually pose a security threat (e.g., guns, knives, electronic triggering devices, etc.) and harmless RFID tags embedded within consumer items. For example, when the metal-detecting RFID receiver device matches signal disturbances with recognized RFID messages that include EPC identifiers, the metal-detecting RFID receiver device may override alarms that would normally be triggered with conventional systems. In this manner, the embodiment techniques may be employed to avoid false alarms and wasted security resources when RFID tags are present.

In some embodiments, the metal-detecting RFID receiver device may be configured to use a phase detector that provides direct current (DC) voltage readings based on the phase relationship between the radio frequency current and voltage at the metal-detecting RFID receiver device antenna. In general, with no metal objects nearby, the phase between voltage and current may typically be 0 (zero) degrees representing a well matched antenna. In other words the impedance of the antenna is primarily resistive with very little of the transmitted radio frequency signal reflected back from the antenna. However, if a metal object is near, the antenna will be detuned and the antenna impedance will have a larger reactive component causing reflection of some of the transmitted power. As a result, the phase between the radio frequency voltage and current will shift (i.e., the larger the metal object nearby, the greater the phase shift). An RFID tag may not cause a significant phase shift, but a metal gun may produce a phase shift that exceeds a predefined threshold. The metal-detecting RFID receiver device may be configured to use the phase detector to measure the shift of the phase between voltage and the current going into an antenna at a given time and determine whether the phase shift exceeds a predefined threshold. If such a phase shift exceeds the predefined threshold, the metal-detecting RFID receiver device may evaluate whether there have been any contemporaneously-received RFID signals from RFID tags. One possibility is to have the metal-detecting RFID receiver device monitor incoming message buffers and evaluate identifiers within received incoming messages. Example messages include Electronic Product Code (EPC) identifiers that indicate product type/class or brand. Based on the receipt of RFID data, the metal-detecting RFID receiver device may determine whether the phase shift is due to RFID tags instead of a non-RFID metal object, such as a gun. For example, the metal-detecting RFID receiver device may calculate whether the phase shift is approximately equal to the expected and combined phase shift that may occur due to receiving the received RFID signals. If the phase shift cannot be explained by the received RFID signals, the metal-detecting RFID receiver device may determine that a non-RFID metal object is likely nearby, and thus may issue security alerts.

In some embodiments, the metal-detecting RFID receiver device may measure and evaluate phase perturbation responses (or resonance values) of nearby objects to distinguish RFID tags from other metal objects. Unlike antennas of RFID tags, larger masses of metal (e.g., a hunk of gold, etc.) may not experience significant changes in their response due to radio waves of varying radio frequencies. For example, a metal gun may produce a similar response to both a 13.56 MHz radio wave and a slightly higher radio wave such as a 20 MHz from a nearby RFID interrogator. However, the response of an HF RFID tag designed with a resonant frequency of 13.56 MHz may be very noticeable in response to a 13.56 MHz radio wave and less noticeable at 20 MHz. Based on these differences, the metal-detecting RFID receiver device may be configured to measure response values using different radio frequencies to identify whether there are nearby objects that have varying responses (i.e., RFID tags) or consistent responses (i.e., non-RFID tags).

In some embodiments, the metal-detecting RFID receiver device may also perform operations to confirm or verify the correctness of information within received RFID messages. For example, when response values are different indicating the presence of only RFID tags, the metal-detecting RFID receiver device may also determine whether RFID messages have been received with valid RFID identifiers in order to confirm the response differences are likely related to the presence of RFID tags. As another example, the metal-detecting RFID receiver device may perform look-up operations on all EPC identifiers of received RFID messages to determine whether there is invalid or otherwise suspicious data that may be further investigated by security personnel.

In some embodiments, the metal-detecting RFID receiver device may be configured to report determinations in various manners. When the presence of non-RFID metal objects is determined to be likely, the metal-detecting RFID receiver device may utilize network interface(s) to transmit various messages to other devices, such as computing devices used by security personnel. For example, when a large phase shift is detected without a corresponding set of received RFID signals, the metal-detecting RFID receiver device may transmit an email over the Internet via an Ethernet connection, text message via a cellular network connection, and/or another alert message wirelessly via a Wi-Fi router. The metal-detecting RFID receiver device may further be configured to present messages indicating the presence of RFID tags and/or non-RFID metal objects. For example, in response to determining that a non-RFID metal object is likely present, the metal-detecting RFID receiver device may transmit a signal via a wired or wireless connection to cause a display unit (e.g., a read-out unit, a monitor, etc.) to render a message indicating security personnel may need to investigate.

In some embodiments, the metal-detecting RFID receiver device may also be configured to transmit data (e.g., a security code, etc.) that may be written to the memory of the RFID tag to assist in easily overcoming subsequent security checks. For example, in response to determining that a user is carrying a valid, identified RFID tag through a security checkpoint in an airport, the metal-detecting RFID receiver device may transmit a message that instructs the RFID tag to write a code that may be transmitted with future RFID messages from the RFID tag, indicating the user has already been cleared by the Transportation Security Administration (TSA) via the metal-detecting RFID receiver device. Such data may be encrypted and may include bits, codes, timestamps, and/or other information that may be used by the metal-detecting RFID receiver device or other similar devices for clearing the RFID tag in future operations.

In some embodiments, other data may be recorded and used for verifying conclusions made by the metal-detecting RFID receiver device. In particular, imagery captured via an imaging device (e.g., a camera) or other sensor (e.g., heat sensor, light sensor, etc.) may be obtained that depicts users and user items within proximity of the metal-detecting RFID receiver device. The metal-detecting RFID receiver device may evaluate such imagery to identify products that may correspond with identifiers retrieved from received RFID messages. If identifiers appear in the imagery, the metal-detecting RFID receiver device may confirm the correctness of the RFID messages. In this way, the metal-detecting RFID receiver device may conduct multi-factor authentication of users based on RFID messages, determining both the likely presence of metal objects as well as the accuracy of RFID message data.

As an illustration, a user may walk up to a security checkpoint or portal that includes a metal-detecting RFID receiver device. In response to receiving an RFID message that includes an identifier, the metal-detecting RFID receiver device may perform a lookup in a database of identifiers to determine a product associated with the identifier, such as a pair of pants having an embedded RFID tag. To confirm this determination, the metal-detecting RFID receiver device may obtain an image of the user, and may perform various image analysis routines on the image to identify whether the pair of pants is shown in the image. If so, the metal-detecting RFID receiver device may determine that the RFID message and thus the transmitting RFID tag, is correct. However, if there is a discrepancy, the metal-detecting RFID receiver device may determine an anomaly (e.g., possibly spoofed or otherwise inaccurate RFID tag, etc.) that should be investigated by nearby security personnel.

In various embodiments, the metal-detecting RFID receiver device may or may not include or otherwise utilize conventional metal detection functionalities, such as a loop antenna. As RFID antenna and conventional metal detectors may utilize a similar radio frequency (e.g., 13.56 MHz), co-locating a conventional metal detector (or loop antenna) and an RFID reader may impede the RFID reader's ability to read RFID messages at certain radio frequencies. However, the metal-detecting RFID receiver device may be configured to activate and deactivate conventional metal detector functionalities in order to obtain initial metal detection data that may drive RFID signal processing of the embodiment techniques. For example, only when any metal is detected by a conventional metal detector module may the metal-detecting RFID receiver device begin performing operations to analyze received RFID messages to determine whether RFID tags, non-RFID metal objects, or both are present. Such gating logic using the conventional functionalities may improve resources of the metal-detecting RFID receiver device as well as provide extended use of existing metal detection systems.

As an illustration, a metal-detecting RFID receiver device may identify that some type of metal object is nearby, such as based on a conventional metal detector functionality included within or coupled to the metal-detecting RFID receiver device. The metal-detecting RFID receiver device may measure a first phase perturbation response value at a first radio frequency and measure a second phase perturbation response value at a second radio frequency. The metal-detecting RFID receiver device may compare the first and second response values to determine whether they are similar within a tolerance level. If the response values are the same (or within the tolerance level), the metal-detecting RFID receiver device may determine that a large, non-RFID metal object is present, but if the response values are different, the metal-detecting RFID receiver device may determine that the metal is likely an RFID tag(s).

In some embodiments, beamforming techniques may be used to more precisely locate a metal object. In this case, an array of antennas may be combined with proper amplitude and phase relationships to focus the radio frequency signal in a single narrow beam such that only metal objects within this beam would be detected. The direction of the beam may be electronically scanned to determine the location of the metal object. In some embodiments, super-resolution processing techniques may be used to achieve location of a metal object without the need to electronically scan the beam.

The various embodiments may improve the functioning of conventional security devices by providing a multi-stage approach to verifying the presence of potentially dangerous metal objects. By coupling metal detector techniques and RFID technology, a metal-detecting RFID receiver device executing embodiment techniques may quickly confirm whether there are valid RFID tags nearby that are transmitting identifiers. Based on such identifiers, the metal-detecting RFID receiver device may easily confirm or reject conclusions as to the presence of non-RFID metal objects, such as those based on phase shift calculations and/or phase perturbation responses. Further, by evaluating the identifiers (e.g., against real-time imagery), the metal-detecting RFID receiver device may intelligently verify objects associated with RFID tags, enabling security teams to avoid burdensome investigations.

FIG. 1 illustrates a communication system 100 including a plurality of RFID tags 102a-102c and a metal-detecting RFID receiver device 110 suitable for use in some embodiments. The metal-detecting RFID receiver device 110 may be located, installed, and/or otherwise operated in any location, environment, and/or scenario in which items having RFID tags 102a-102c are used. For instance and as illustrated in FIG. 1, the metal-detecting RFID receiver device 110 may be placed within a portal 112 between an unsecure and a secure area, such as between the outside and the inside of a secure building or room. For example, the portal 112 may be a structure placed in between an unsecured ticketing area and a secured boarding area of an airport. As another example, the portal 112 may be a "doorframe" co-located with a doorway entering into a courtroom. The metal-detecting RFID receiver device 110 may be installed within, encased by, concealed within, affixed to, or otherwise connected to the portal 112 such that there is little or no obstruction to the reception of RFID signals by the metal-detecting RFID receiver device 110. For example, the metal-detecting RFID receiver device 110 may be placed within a "doorframe" portal 112. In some embodiments, the metal-detecting RFID receiver device 110 may be not be within a portal 112, but instead may be within a handheld device, a floor mat, and/or other structures or devices.

Based on its placement in the portal 112, the metal-detecting RFID receiver device 110 may be used to monitor for (or scan for) metal objects carried by people within proximity of the secured area. For example, the metal-detecting RFID receiver device 110 may scan for metal weapons carried by people walking through the portal 112 in order to get into a secure area of an airport. As shown in FIG. 1, a user 106 may carry the plurality of RFID tags 102a-102c within bags, luggage, clothes, and/or other items. For example, a first RFID tag 102a may be woven into the fabric 105 of the pants of the user 106, a second RFID tag 102b may be included within a shoe of the user 106, and a third RFID tag 102c may be included within a badge or nametag worn by the user 106. When within transmission range, the metal-detecting RFID receiver device 110 and each of the RFID tags 102a-102c may exchange signals via the wireless connections 103a-103c. For example, when the RFID tags 102a-102c are passive RFID tags, the metal-detecting RFID receiver device 110 may transmit interrogation signals that cause each of the RFID tags 102a-102c to respond with signals that indicate their stored identification data (e.g., electronic product code (EPC), brand identifier, serial number, expiration date, etc.).

In some embodiments, the metal-detecting RFID receiver device 110 may be configured with various networking interfaces for communicating over network(s) 130, such as a local area network (LAN) and/or a wide area network (WAN). For example, the metal-detecting RFID receiver device 110 may utilize a wired or wireless connection 111 (e.g., an Ethernet cable to a router, wireless link to a Wi-Fi® router, a cellular network connection, etc.) for accessing local devices via a LAN and/or remote devices via the Internet. In some embodiments, the metal-detecting RFID receiver device 110 may utilize a direct wired or wireless connection 143 to a local computing device 140. For example, the metal-detecting RFID receiver device 110 may be connected to server or desktop computer within a security office of an airport, etc. Such a local computing device 140 may also utilize a connection 141 to the network(s) 130, and thus may alternatively be connected to the metal-detecting RFID receiver device 110 via the network(s) 130 (e.g., a Wi-Fi® LAN, etc.).

In some embodiments, the local computing device 140 and/or the metal-detecting RFID receiver device 110 may be configured to communicate with various remote devices via the network(s) 130 (e.g., the Internet). For example, the metal-detecting RFID receiver device 110 and/or the local computing device 140 may access the remote server computing device 150 connected to the network(s) 130 via a connection 151. Such a remote server computing device 150 may be associated with various services, such as inventory systems, government agencies, databases, etc., and may be configured to provide information to the metal-detecting RFID receiver device 110 and/or the local computing device 140. For example, the remote server computing device 150 may be associated with a database that stores information that may be used by the metal-detecting RFID receiver device 110 to evaluate EPC identifiers received from the plurality of RFID tags 102a-102c. As another example, the metal-detecting RFID receiver device 110 or the local computing device 140 may receive from the remote server computing device 150 lists of stolen or otherwise compromised identifiers that may be checked against identifiers obtained from the RFID tags 102a-102c.

In some embodiments, the metal-detecting RFID receiver device 110 may utilize various optional components related to the detection and communication of the presence of metal objects. In particular, the metal-detecting RFID receiver device 110 may be connected to one or more additional metal detector units 120 within the portal 112 that are configured to identify the presence of any metal objects within proximity. For example, the portal 112 may include a device configured to detect changes in a magnetic field due to nearby metal objects. Such metal detector units 120 may be configured to transmit data via wired or wireless connection 121 to the metal-detecting RFID receiver device 110 that indicates whether the presence of metal has been detected at a given time or event (e.g., during a scan). To avoid interference to the metal-detecting RFID receiver device 110, the metal detector unit 120 may be physically separate from the metal-detecting RFID receiver device 110, such as being on the opposite side of the portal 112.

In some embodiments, the metal-detecting RFID receiver device 110 may also utilize a display unit 115 within the portal 112, such as an LED screen configured to render alerts or other messages related to scanning operations. The display unit 115 may be coupled to the metal-detecting RFID receiver device 110 via a wired or wireless connection 116 so that the display unit 115 may receive various messages to be rendered related to operations of the metal-detecting RFID receiver device 110. For example, the display unit 115 may receive data causing the display unit 115 to render text messages indicating that no non-RFID metal objects have been detected on the user 106 (e.g., "All clear, no other metal items found."). As another example, the display unit 115 may receive messages causing the display unit 115 to render information indicating that a gun, knife, or other dangerous metal object is likely detected on the user 106 (e.g., "Alert—non-RFID metal object detected."). In some embodiments, the display unit 115 may include or otherwise be coupled to speakers, lights, sirens, and/or other output devices for rendering information.

In some embodiments, the portal 112 may also include an imaging device 118 (e.g., a camera, video camera, etc.) coupled to the metal-detecting RFID receiver device 110 via a wired or wireless connection 119. Such an imaging device 118 may be configured to record and relay imagery (e.g., individual photographs, video, etc.) of the user 106 to the metal-detecting RFID receiver device 110 for use in cross-checking or otherwise confirming conclusions of the metal-detecting RFID receiver device 110 regarding the presence of the RFID tags 102a-102c. For example, based on an image of the user 106 taken by the imaging device 118, the metal-detecting RFID receiver device 110 may cross-check product identifiers (e.g., EPC) identified within received RFID transmissions to determine whether there is any discrepancy between the identifiers and the products (e.g., shirts, pants, bags, badges, etc.) that are actually within proximity of the metal-detecting RFID receiver device 110. In some embodiments, any combination of the optional components 115, 118, 120 may be included within the metal-detecting RFID receiver device 110 itself.

Figure 2A:
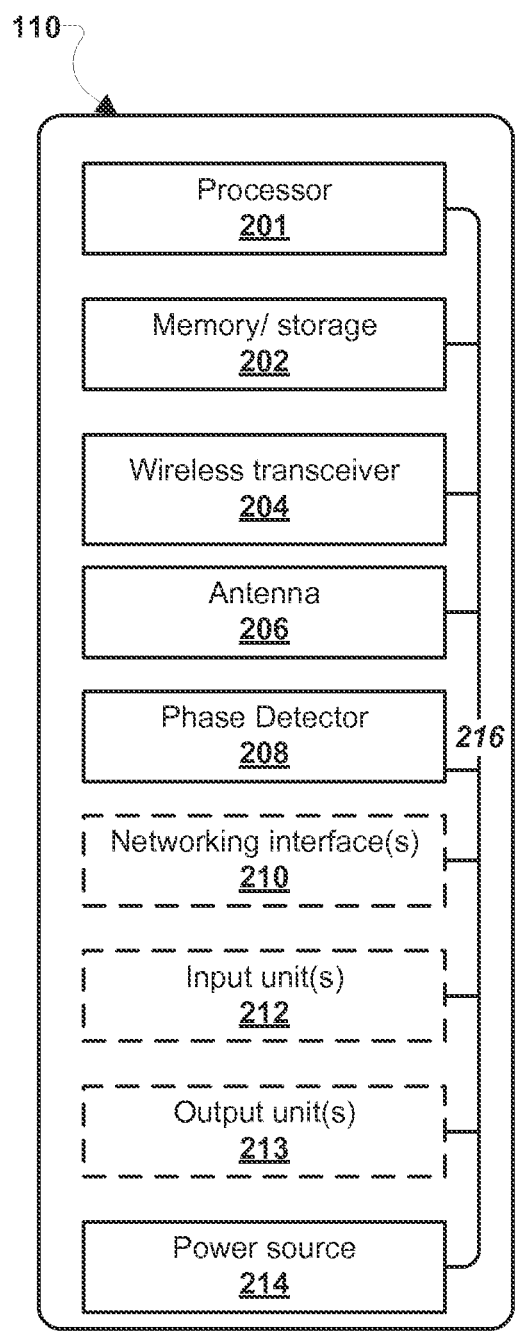
FIG. 2A is a component block diagram of an exemplary metal-detecting RFID receiver device suitable for use in some embodiments.

FIG. 2A illustrates components of an exemplary metal-detecting RFID receiver device 110 suitable for use in some embodiments. The metal-detecting RFID receiver device 110 may include a processor 201 and an internal memory 202 for processing and storing software, messages, instructions, and other data. In some embodiments, the processor 201 may be one or more processors or processing units designated for general or specific processing tasks. The internal memory 202 may be volatile or non-volatile memory, and may also be secure and/or encrypted memory, or unsecure and/or unencrypted memory, or any combination thereof. The metal-detecting RFID receiver device 110 may also include one or more transceivers 204 (or radio signal transceiver) and one or more antennas 206, for sending and receiving electromagnetic radiation signaling. In some embodiments, the metal-detecting RFID receiver device 110 may use the transceiver 204 and antenna 206 to exchange signaling using various conventional wireless communication protocols or standards, such as Wi-Fi®, RF, Bluetooth®, ZigBee®, and IEEE 802.15.4. In some embodiments the metal-detecting RFID receiver device 110 may integrate the antenna 206 into existing antennas of a portal 112 or other structure.

The metal-detecting RFID receiver device 110 may also include a phase detector 208 unit that is configured to determine the phase shift (or phase difference) between voltage and current going into the antenna 206 at a given time. The metal-detecting RFID receiver device 110 may also include optional network interface(s) 210 (e.g., Ethernet, cellular network, etc.), input unit(s) 212 (e.g., Universal Serial Bus (USB) ports, touch screen, microphone, camera, mouse, keyboard, tactile buttons/dials/switches, etc.), optional output unit(s) 213 (e.g., screens, speakers, sirens, lights, etc.), and a power source 214, such as a disposable or rechargeable battery. The various components 201-214 may be interconnected in various manners via a system bus 216 or other similar circuitry.

Figure 2B:
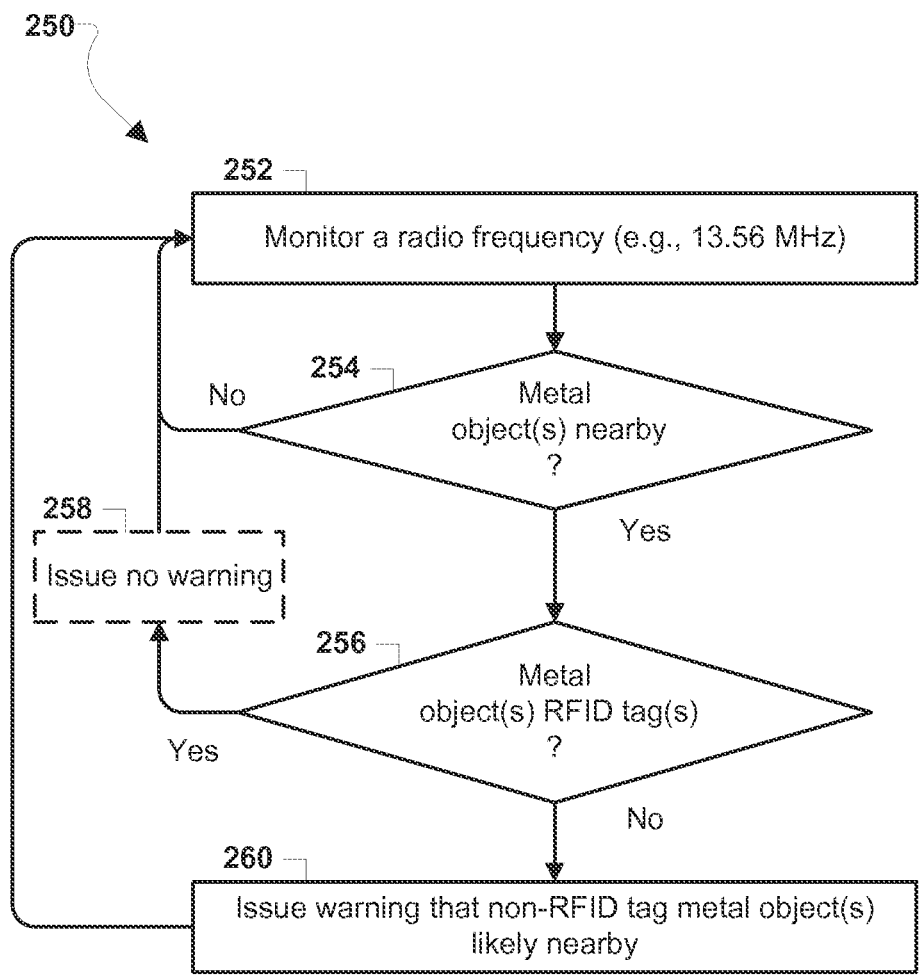
FIG. 2B is a process flow diagram illustrating an embodiment method for a metal-detecting RFID receiver device to determine the presence of non-RFID metal objects.

FIG. 2B illustrates a simplified embodiment method 250 for a metal-detecting RFID receiver device to determine the likely presence of a non-RFID metal object. The operations of the method 250 may be performed by a processor of the metal-detecting RFID receiver device such as illustrated above with reference to FIG. 2A. Further, the various operations of the method 250 may be accomplished by the metal-detecting RFID receiver device via any combination of software or processor-executable instructions, logic, circuitry, routines, and/or other functionalities.

In block 252, the processor of the metal-detecting RFID receiver device may monitor one or more radio frequencies, such as various known or typical resonant frequencies of RFID tags (e.g., 13.56 MHz). The radio frequencies may be within the ultra-high frequency (UHF) range of frequencies and/or a high-frequency (HF) range of frequencies. In determination block 254, the processor of the metal-detecting RFID receiver device may determine whether there are one or more metal objects nearby, such as within a reception range of the monitored radio frequencies. In some embodiments, the metal detection determination of determination block 254 may include or otherwise be accomplished via any or all of the operations of blocks 302-306 with reference to FIGS. 3-4, blocks 502-504 with reference to FIG. 5, and/or blocks 602-606 with reference to FIG. 6 as described below. In response to determining that no metal objects are nearby (i.e., determination block 254="No"), the metal-detecting RFID receiver device may return to the monitoring operations of block 252. In response to determining that one or more metal objects are nearby (i.e., determination block 254="Yes"), the processor of the metal-detecting RFID receiver device may determine whether the detected one or more metal objects are likely RFID tag(s) or include non-RFID tag(s) (or non-RFID metal object(s)) in determination block 256. In some embodiments, the determination operations of determination block 256 may include or otherwise be accomplished via any or all of the operations of blocks 308-310 with reference to FIG. 3, blocks 308-406 with reference to FIG. 4, and/or blocks 506-310 with reference to FIG. 5 as described below. In response to determining that the one or more metal objects are likely RFID tag(s) (i.e., determination block 256="Yes"), the processor of the metal-detecting RFID receiver device may issue no warning in optional block 258 and continue with the monitoring operations in block 252. In response to determining that one or more metal objects are not likely RFID tag(s) (i.e., determination block 256="No"), the processor of the metal-detecting RFID receiver device may issue a warning that one or more nearby metal objects are non-RFID tag(s) in block 260. The metal-detecting RFID receiver device may then continue with the monitoring operations in block 252. In some embodiments, the operations of optional block 258 may include or otherwise be accomplished via the operations of blocks 314-316, 322 of FIG. 3 and/or the operations in block 260 may include or otherwise be accomplished via the operations of blocks 318-322 of FIG. 3 as described below.

Figure 3:
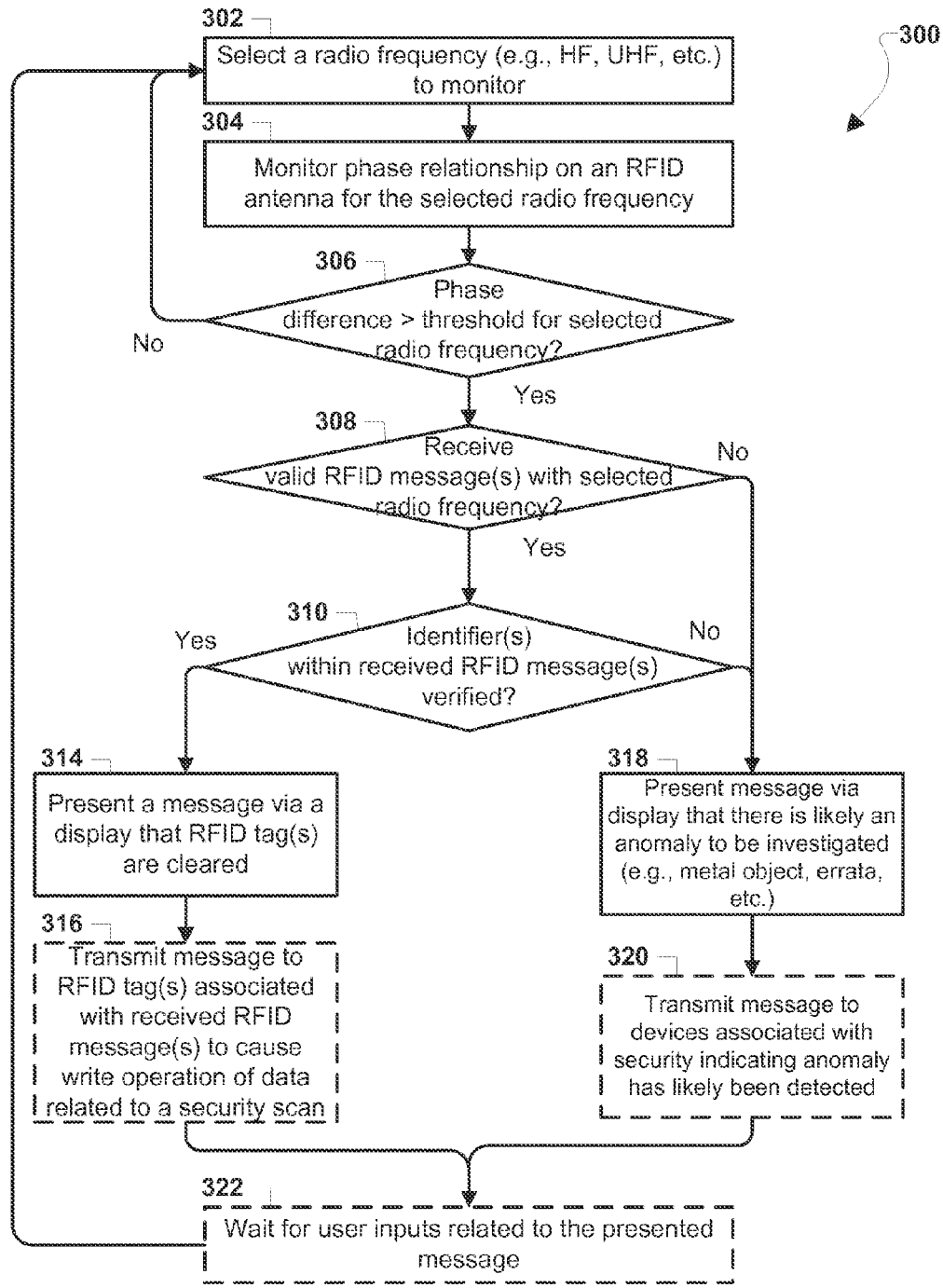
FIG. 3 is a process flow diagram illustrating an embodiment method for a metal-detecting RFID receiver device to evaluate phase shifts to determine the presence of non-RFID metal objects.

FIG. 3 illustrates an embodiment method 300 for a metal-detecting RFID receiver device to evaluate the phase relationship between the radio frequency current and voltage at the metal-detecting RFID reader device antenna to determine the presence of a non-RFID metal object. In block 302, the processor of the metal-detecting RFID receiver device may select a radio frequency. For example, the metal-detecting RFID receiver device may select one of a plurality of radio frequencies within radio bands that correspond to RFID tags for which the metal-detecting RFID receiver device is configured to monitor, or outside these radio bands. The metal-detecting RFID receiver device may tune its RFID antenna to detect signals on the selected radio frequency. In various embodiments, the selected radio frequency may be within an ultra-high frequency (UHF) range of frequencies or a high-frequency (HF) range of frequencies. In block 304, the processor of the metal-detecting RFID receiver device may monitor a phase relationship on an RFID antenna for the selected radio frequency. In particular, the metal-detecting RFID receiver device may monitor or measure the phase relationship between a current and a voltage at an RFID antenna for the selected or monitored radio frequency to identify phase shifts. As described above, the presence of non-RFID metal objects may result in a larger phase shift than caused by RFID tags alone. In some embodiments, the metal-detecting RFID receiver device may evaluate output data (e.g., DC voltage readings) from a phase detector.

In determination block 306, the processor of the metal-detecting RFID receiver device may determine whether there is a phase difference or phase shift that is greater than a predefined threshold for the selected radio frequency based on the monitored phase relationship. For example, the metal-detecting RFID receiver device may compare output data (e.g., DC voltage readings) from the phase detector to predefined thresholds known to correspond to phase shifts for RFID tags alone. In response to determining that the monitored phase shift is not greater than a predefined threshold for the selected radio frequency (i.e., determination block 306="No"), the metal-detecting RFID receiver device may determine that there is no indication of a non-RFID metal object with regard to the selected radio frequency, and may continue with the selection operations of block 302.

In response to determining that the monitored phase shift is greater than a predefined threshold for the selected radio frequency (i.e., determination block 306="Yes"), the processor of the metal-detecting RFID receiver device may determine whether a valid RFID message(s) is received from nearby RFID tag(s) with the selected radio frequency in determination block 308. For example, the metal-detecting RFID receiver device may monitor an incoming message buffer associated with RFID messages for the currently selected radio frequency (e.g., UHF, HF, etc.). The metal-detecting RFID receiver device may parse and evaluate any received RFID messages to determine their validity based on the inclusion of particular codes, formatting, and/or other data specific to RFID tags. For example, the metal-detecting RFID receiver device may determine whether incoming messages include a particular number of bits of data and/or include predefined codes or data segments (e.g., a header).

In response to determining that a valid RFID message(s) is received with the selected radio frequency (i.e., determination block 308="Yes"), the processor of the metal-detecting RFID receiver device may determine whether identifier(s) within the received RFID message(s) are verified in determination block 310. For example, the metal-detecting RFID receiver device may cross-check EPC identifiers received from RFID signals with predefined lists of known or otherwise valid EPC identifiers. Although this checking may not indicate whether a non-RFID metal object is present, it may provide information useful for informing security agents of possible problems or suspicious circumstances with RFID tags. For example, the metal-detecting RFID receiver device may transmit warning messages to devices of security personnel of an airport in response to determining that an RFID message was received that included an EPC code for farming equipment instead of clothing.

In response to determining the identifier(s) within the received RFID message(s) are verified (i.e., determination block 310="Yes"), the processor of the metal-detecting RFID receiver device may present a message via a display indicating that RFID tag(s) are cleared in block 314. For example, the metal-detecting RFID receiver device may wirelessly transmit a signal to an LED monitor causing a graphical message to be rendered indicating the user may proceed through the security checkpoint without further investigation. In optional block 316, the processor of the metal-detecting RFID receiver device may transmit a message to the RFID tag(s) associated with received RFID message(s) to cause a write operation of data related to a security scan. For example, the metal-detecting RFID receiver device may wirelessly transmit to cause the RFID tag(s) that sent the received RFID message(s) to store a security code or change a bit indicating that the RFID tag(s) had been cleared by the metal-detecting RFID receiver device during a scan. Such written data may be used by the RFID tag(s) in future transmissions, such as in subsequent broadcasts of RFID messages in response to interrogation signals from the metal-detecting RFID receiver device and/or other similar devices within a secure area or otherwise related to a security check.

In response to determining that a valid RFID message(s) is not received with the selected radio frequency (i.e., determination block 308="No"), or in response to determining the identifier(s) within the received RFID message(s) are not verified (i.e., determination block 310="No"), the processor of the metal-detecting RFID receiver device may present a message via a display indicating that there is likely an anomaly to be investigated (e.g., a non-RFID metal object, errata, etc.) in block 318. For example, the metal-detecting RFID receiver device may render a message, a sound, or other signaling discernible to humans that there is likely a non-RFID metal object to be assessed at a check-in station. In optional block 320, the processor of the metal-detecting RFID receiver device may transmit a message to device(s) associated with security indicating that the anomaly has likely been detected. For example, the metal-detecting RFID receiver device may utilize a Bluetooth, Wi-Fi, or other wireless communication protocol to transmit messages to nearby devices of security personnel (e.g., mobile devices carried by security guards, desktop computers within a security office, etc.). The messages may instruct security personnel to further investigate the person and/or items that are currently being scanned, such as by instructing security guards to utilize portable wands to determine with more accuracy whether a person being scanned is carrying a weapon, etc.

In optional block 322, the processor of the metal-detecting RFID receiver device may wait for user inputs related to the presented message. For example, the metal-detecting RFID receiver device may be configured to pause until confirmation inputs have been received from security personnel via a keyboard connected to the metal-detecting RFID receiver device, messages received from security personnel devices via a networking interface, etc. The metal-detecting RFID receiver device may continue with the selection operations in block 302.

Figure 4:
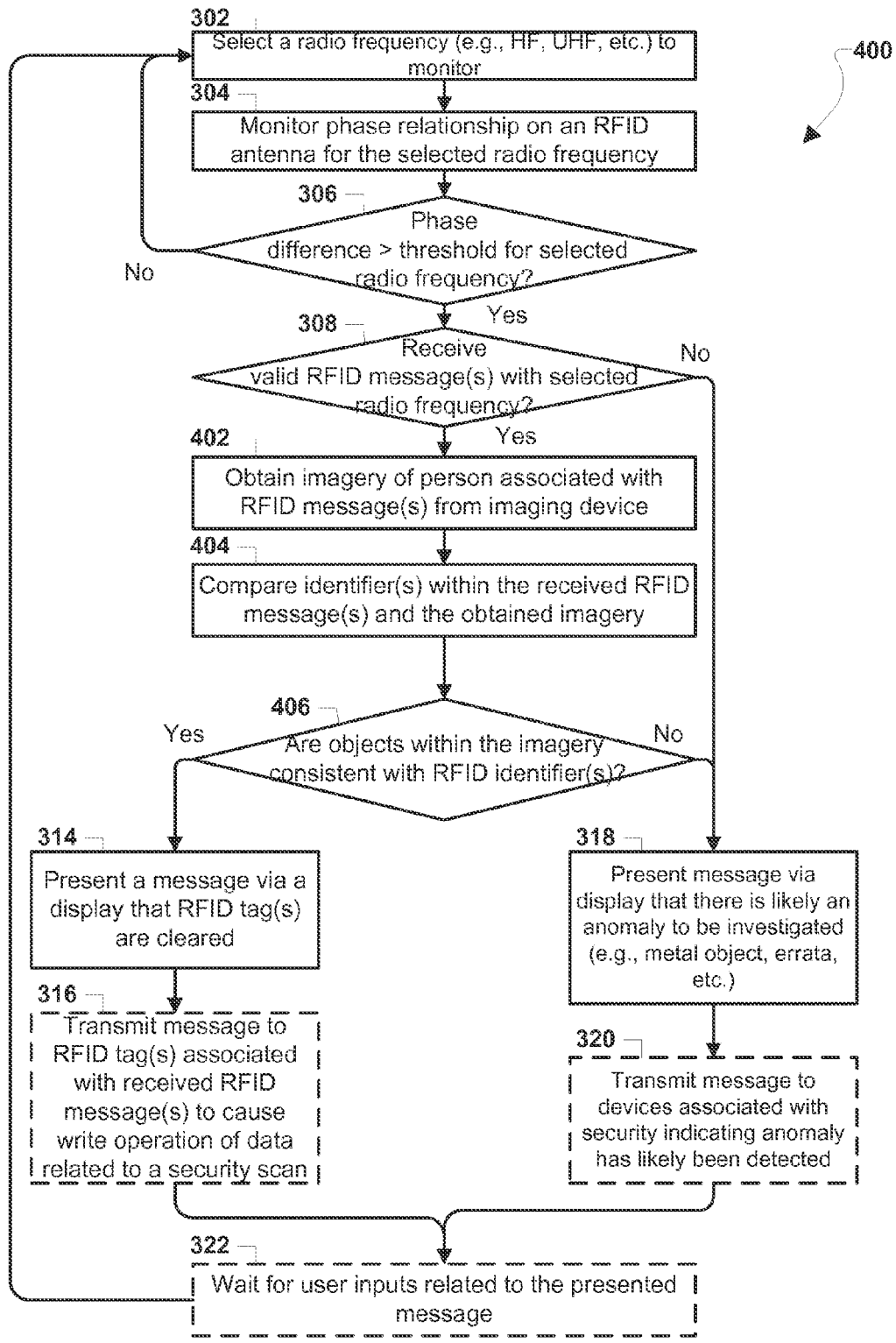
FIG. 4 is a process flow diagram illustrating an embodiment method for a metal-detecting RFID receiver device to evaluate imagery to determine the presence of non-RFID metal objects.

FIG. 4 illustrates an embodiment method 400 for a metal-detecting RFID receiver device to evaluate imagery to determine the presence of a non-RFID metal object. The method 400 is similar to the method 300 described above with reference to FIG. 3, except that the method 400 includes explicit operations for obtaining and evaluating imagery to confirm information received from RFID messages. In order to verify that a nearby RFID tag or the metal-detecting RFID receiver device has not been tampered with (e.g., hacked, spoofed, etc.), the metal-detecting RFID receiver device may compare identifiers of received RFID messages to real-time pictures that should correspond to the identifiers. For example, in response to obtaining an RFID message with an EPC identifier for a certain handbag, the metal-detecting RFID receiver device may obtain a digital photo of a person in a security scanning area that may be processed to determine whether the person is carrying the handbag. Such verification operations may be useful in improving accuracy of determinations reached by the metal-detecting RFID receiver device as to whether non-RFID metal objects are present at a given time or there exist other anomalous conditions that should be investigated by security personnel.

The metal-detecting RFID receiver device may perform the operations of blocks 302-308 that may be similar to the operations of like numbered blocks described above with reference to FIG. 3. In response to determining that a valid RFID message(s) is received with the selected radio frequency (i.e., determination block 308="Yes"), the processor of the metal-detecting RFID receiver device may obtain imagery of a person associated with the RFID message(s) from an imaging device (e.g., a camera, etc.) in block 402. For example, the metal-detecting RFID receiver device may transmit a signal to a connected camera causing the collection of images of a person in a security checkpoint area. In some embodiments, the metal-detecting RFID receiver device may be configured to continually receive imagery from the imaging device, such as with a stream of surveillance images or video from a video-capable camera. In such a scenario, the metal-detecting RFID receiver device may retrieve one or more images from a buffer corresponding to the time the RFID message(s) were received. In some embodiments, the imagery may be obtained via various sensors, such as light sensors, or alternatively x-rays. In some embodiments, the metal-detecting RFID receiver device may be configured to match RFID messages with other transmitting devices on a person for verification purposes, such as by matching RFID messages to cell phones configured to use various wireless signaling technologies or protocols (e.g., iBeacon®, S Beam®, Bluetooth®, etc.).

In block 404, the processor of the metal-detecting RFID receiver device may compare the identifier(s) within the received RFID message(s) and the obtained imagery. In particular, the metal-detecting RFID receiver device may perform lookup operations on any identifiers received within the received RFID message(s) to identify the type, class, description, and/or other characteristics associated with the RFID tag and/or the item to which it is affixed. With this information, the metal-detecting RFID receiver device may perform image processing operations on the obtained imagery to detect whether the items identified as associated with the RFID message(s) are actually depicted within the imagery. For example, in response to determining that EPC identifiers for a tractor are received within an RFID message, the metal-detecting RFID receiver device may evaluate the imagery to determine whether a tractor is currently in the security checkpoint area. In various embodiments, the comparisons and image processing may include general evaluations (e.g., is there a certain type of jacket in the imagery, etc.) or may include specific evaluations of the various characteristics of items within the imagery, such as color, size, shape, make, model, and other detailed traits of elements within the imagery.

In determination block 406, the processor of the metal-detecting RFID receiver device may determine whether the objects within the images are consistent with the RFID identifier(s) based on the comparisons. For example, the metal-detecting RFID receiver device may determine whether it identified a product within the imagery that matches an EPC identifier received in the RFID messages. In response to determining that the objects within the images are not consistent with the RFID identifier(s) (i.e., determination block 406="No"), the metal-detecting RFID receiver device may perform operations in blocks 318-322 similar to the operations of like numbered blocks described above with reference to FIG. 3. In response to determining that the objects within the images are consistent with the RFID identifier(s) (i.e., determination block 406="Yes"), the metal-detecting RFID receiver device may perform operations in block 314 for presenting a message similar to the operations of like numbered blocks described above with reference to FIG. 3.

Figure 5:
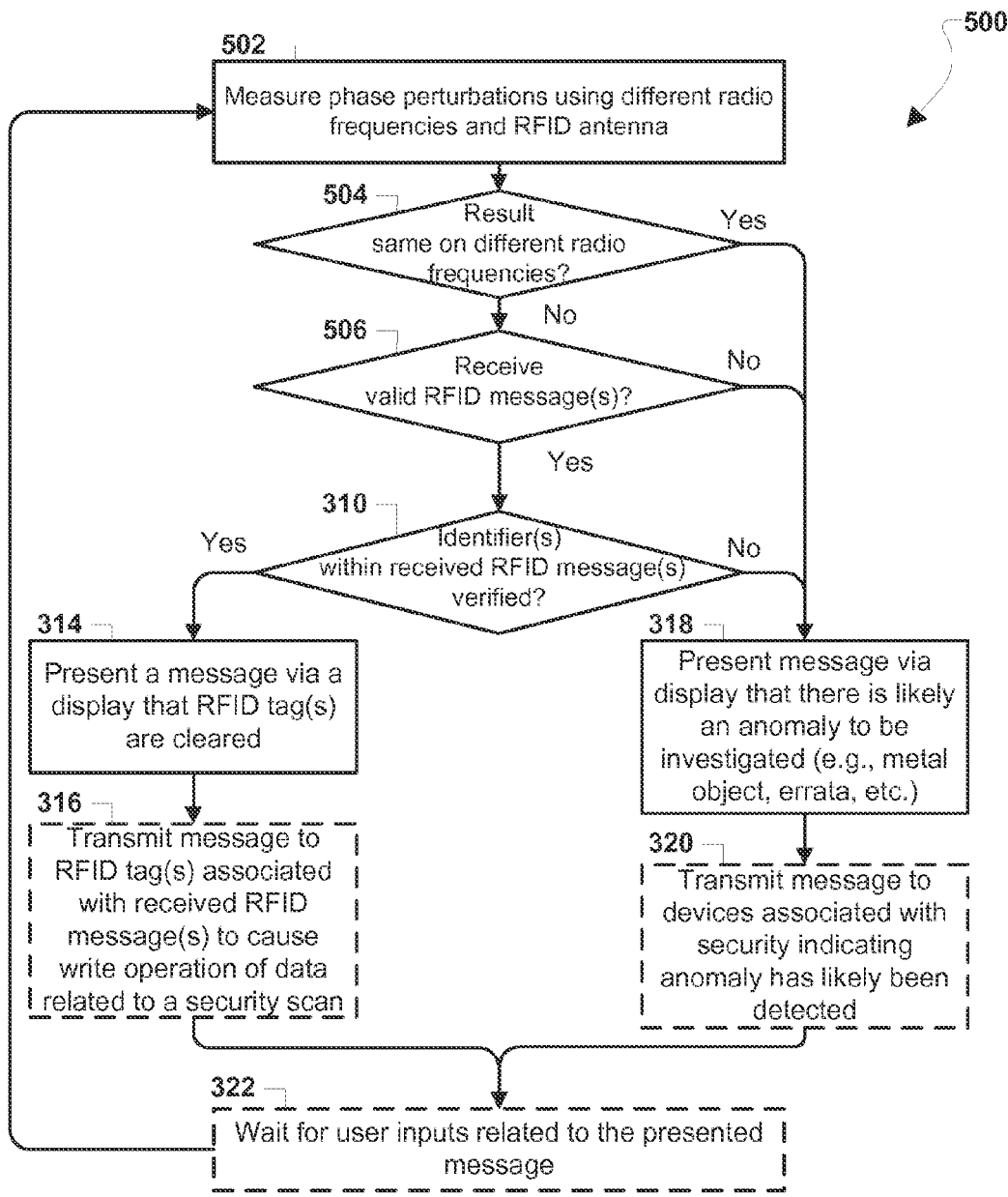
FIG. 5 is a process flow diagram illustrating an embodiment method for a metal-detecting RFID receiver device to evaluate phase perturbation response values to determine the likely presence of non-RFID metal objects.

FIG. 5 illustrates an embodiment method 500 for a metal-detecting RFID receiver device to evaluate phase perturbation responses. In other words, the metal-detecting RFID receiver device may evaluate phase responses as a function of frequency to determine the presence of non-RFID metal objects. The method 500 is similar to the method 300 described above with reference to FIG. 3, except that instead of evaluating phase responses between the antenna current and voltage at a single frequency, the method 500 includes explicit operations for evaluating phase responses at multiple frequencies. Evaluation of the phase responses as a function of frequency may indicate the presence of non-RFID metal objects. In general, a non-RFID metal object would be expected to have a similar response for two frequencies, such as 13.56 MHz and 20 MHz. An RFID tag would be expected to have a much more significant response at its resonant frequency (e.g., 13.56 MHz). The metal-detecting RFID receiver device may determine that a weapon is present in response to readings on two different frequencies that both show significant changes in the phase relationship between the radio frequency current and voltage.

In block 502, the processor of the metal-detecting RFID receiver device may measure phase perturbations using different radio frequencies and an RFID antenna. In particular, the metal-detecting RFID receiver device may measure a first phase perturbation response using a first monitored frequency and measure a second phase perturbation response using a typical or known resonant frequency of RFID tags (e.g., 13.56 MHz) and determine whether there is likely a non-RFID device nearby based on whether the difference between the first and second phase perturbation responses is significant. For example, the metal-detecting RFID receiver device may tune the RFID antenna to a first frequency (e.g., 20 MHz) to record a first measurement of DC voltage from a phase detector and then tune the antenna to known designed resonant radio frequency for an RFID tag (e.g., 13.56 MHz, etc.) to record a second measurement of the DC voltage from the phase detector included within or coupled to the metal-detecting RFID receiver device. In determination block 504, the processor of the metal-detecting RFID receiver device may determine whether a similar result is obtained on different radio frequencies (e.g., frequencies that are outside the target RFID tag's designed resonant frequency). In other words, the metal-detecting RFID receiver device may compare the measurements to determine whether there is likely a RFID device nearby based on whether the difference between the first and second phase perturbation responses exceeds a predefined significance threshold. For example, the metal-detecting RFID receiver device may compare the measured phase detector response for a first radio frequency and a second radio frequency using the RFID antenna to identify whether there is a difference or whether the values are within a tolerance threshold of one another. As described above, the measurable response (i.e., phase perturbation) for an RFID tag to different radio frequencies will be significantly more at its designed resonance, but the response of large metal objects may be more consistent and not significantly change with different radio frequencies. Thus, any detected changes that exceed a predefined threshold may indicate at least the presence of RFID tags. For example, when there are only RFID tags nearby, the metal-detecting RFID receiver device may measure phase detector responses that are significantly different at the resonant frequency of the target RFID tag and a different radio frequency. Alternatively, if the phase detector response between the different radio frequencies is similar, the metal-detecting RFID receiver device may determine that there are either no metal objects present (e.g., RFID tags or non-RFID metal objects) or that there are at least non-RFID metal objects present. When a large metal item is nearby, regardless of whether there are also RFID tags, the metal-detecting RFID receiver device may detect little change in phase detector response between two radio frequencies due to the consistent effect of the large metal item.

In response to determining that the phase perturbation values are not the same on the different radio frequencies (i.e., determination block 504="No"), the processor of the metal-detecting RFID receiver device may determine whether valid RFID message(s) are received in determination block 506. The operations of determination block 506 may be similar to those described above with reference to determination block 308 of FIG. 3, except that the valid RFID message(s) may be detected on a plurality of radio frequencies available to the metal-detecting RFID receiver device instead of merely a selected radio frequency at a given time. In response to determining that valid RFID message(s) are received (i.e., determination block 506="Yes"), the metal-detecting RFID receiver device may determine whether identifier(s) within the received RFID message(s) are verified in determination block 310 similar to as described above with like numbered blocks of FIG. 3.

In response to determining that the received RFID message(s) are verified (i.e., determination block 310="Yes"), the metal-detecting RFID receiver device may perform the operations of blocks 314-316 that may be similar to the operations of like numbered blocks described above with reference to FIG. 3.

In response to determining that the phase perturbation values are the same on the different radio frequencies (i.e., determination block 504="Yes"), or in response to determining that no valid RFID message(s) are received (i.e., determination block 506="No"), or in response to determining that the identifier(s) within received RFID message(s) are not verified (i.e., determination block 310="No"), the processor of the metal-detecting RFID receiver device may present a message via a display indicating that there is likely an anomaly to be investigated (e.g., metal object, errata, etc.) in block 318, and may transmit a message to devices associated with security indicating anomaly has likely been detected in optional block 320 as described above with reference to FIG. 3. In response to performing the operations of either optional block 316 or optional block 320, the metal-detecting RFID receiver device may perform the operations of optional block 322 that may be similar to the operations of like numbered block described above with reference to FIG. 3, and may continue with the measurement operations in block 502.

Figure 6:
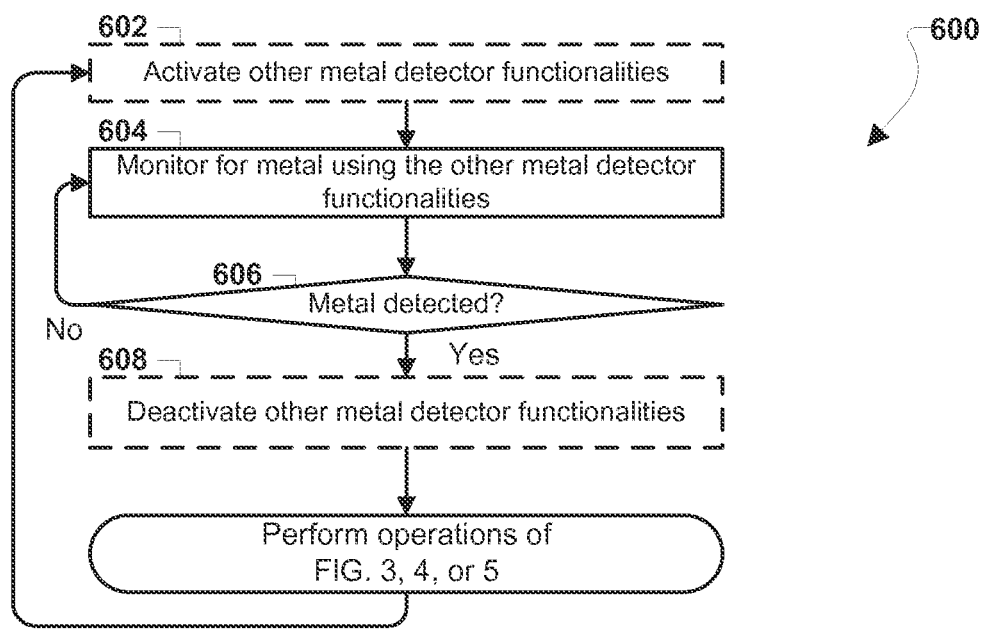
FIG. 6 is a process flow diagram illustrating an embodiment method for a metal-detecting RFID receiver device to utilize conventional metal detection functionalities in combination with the methods of FIG. 3, 4, or 5.

FIG. 6 illustrates an embodiment method 600 for a metal-detecting RFID receiver device to utilize other metal detection functionalities in combination with the RFID techniques described above with reference to FIGS. 3, 4, and/or 5. In particular, the metal-detecting RFID receiver device may utilize metal detection as an entry condition to performing evaluations of RFID messages. For example, the metal-detecting RFID receiver device may utilize a typical loop antenna to identify when any metal objects are nearby and trigger the execution of operations that evaluate RFID messages, phase shifts, and/or phase perturbation response values as described above to distinguish between RFID tags and non-RFID metal objects. In this manner, the metal-detecting RFID receiver device may leverage and enhance existing metal detection techniques and equipment to improve efficiency and resource utilization related to a security screening process.

In optional block 602, the processor of the metal-detecting RFID receiver device may activate one or more other metal detector functionalities, such as by energizing a loop antenna configured to detect changes in magnetic fields due to the presence of metal objects. In block 604, the processor of the metal-detecting RFID receiver device may monitor for metal using a current or future metal detector functionality. In determination block 606, the processor of the metal-detecting RFID receiver device may determine whether metal is detected based on the monitoring by the other metal detector functionalities. In response to determining that metal is not detected (i.e., determination block 606="No"), the metal-detecting RFID receiver device may continue with the monitoring operations in block 604. In response to determining that metal is detected (i.e., determination block 606="Yes"), the metal-detecting RFID receiver device may deactivate the other metal detector functionalities in optional block 608. Such deactivation operations may be needed to limit the interferences that may be experienced by an RFID antenna when receiving incoming RFID messages. The metal-detecting RFID receiver device may perform the operations of the methods 300, 400, or 500 described above with reference to FIGS. 3, 4, and 5, respectively. The metal-detecting RFID receiver device may continue with the activation operations of optional block 602.

Figure 7:
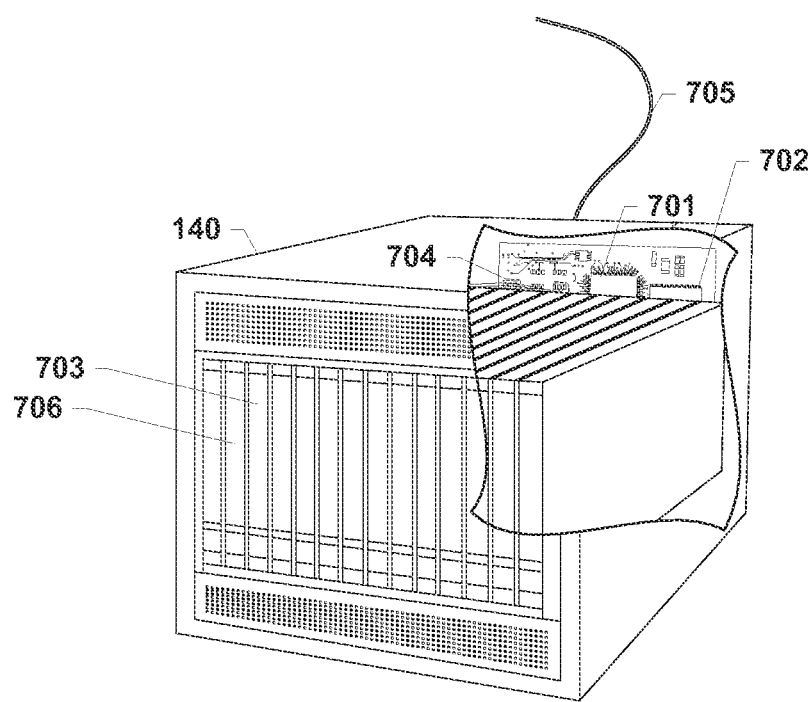
FIG. 7 is a component block diagram of a server computing device suitable for use in some embodiments.

Various forms of computing devices, including personal computers, mobile computing devices (e.g., smartphones, etc.), servers, laptop computers, etc., may be used to implement the various embodiments. Such computing devices may typically include, at least, the components illustrated in FIG. 7 which illustrates an example server-type computing device. Such a computing device 140 may typically include a processor 701 coupled to volatile memory 702 and a large capacity nonvolatile memory, such as a disk drive 703. The computing device 140 may also include a floppy disc drive, compact disc (CD) or DVD disc drive 706 coupled to the processor 701. The computing device 140 may also include network access ports 704 (or interfaces) coupled to the processor 701 for establishing data connections with a network 705, such as the Internet and/or a local area network coupled to other system computers and servers.

The various processors described herein may be any programmable microprocessor, microcomputer or multiple processor chip or chips that can be configured by software instructions (applications) to perform a variety of functions, including the functions of the various embodiments described herein. In the various devices, multiple processors may be provided, such as one processor dedicated to wireless communication functions and one processor dedicated to running other applications. Typically, software applications may be stored in internal memory before they are accessed and loaded into the processors. The processors may include internal memory sufficient to store the application software instructions. In many devices the internal memory may be a volatile or nonvolatile memory, such as flash memory, or a mixture of both. For the purposes of this description, a general reference to memory refers to memory accessible by the processors including internal memory or removable memory plugged into the various devices and memory within the processors.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a non-transitory processor-readable, computer-readable, or server-readable medium or a non-transitory processor-readable storage medium. The steps of a method or algorithm disclosed herein may be embodied in a processor-executable software module or processor-executable software instructions which may reside on a non-transitory computer-readable storage medium, a non-transitory server-readable storage medium, and/or a non-transitory processor-readable storage medium. In various embodiments, such instructions may be stored processor-executable instructions or stored processor-executable software instructions. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory processor-readable storage medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for improving metal object detection and reducing false alarms by integrating Radio Frequency Identification (RFID) reader and metal-detecting functionalities, the method comprising:
   monitoring, via a processor of a metal-detecting RFID receiver device, a radio frequency;
   determining, via the processor, whether there are one or more metal objects nearby using the monitored radio frequency by measuring a first phase perturbation response using the monitored radio frequency; and
   determining, via the processor in response to determining there are one or more metal objects nearby, whether the one or more metal objects are RFID tags or include at least one non-RFID metal object by:
      measuring, via the processor, a second phase perturbation response using a resonant frequency of RFID tags; and
      determining, via the processor, whether there is likely a non-RFID metal object nearby based on whether a difference between the first phase perturbation response and the second phase perturbation response is significant.

2. The method of claim 1, wherein determining, via the processor, whether there are one or more metal objects nearby using the monitored radio frequency comprises:
   monitoring, via the processor, a phase relationship between a current and a voltage at an RFID antenna for the monitored radio frequency; and
   determining, via the processor, whether there is a phase shift that is greater than a predefined threshold for the monitored radio frequency based on the monitored phase relationship.

3. The method of claim 1, wherein the monitored radio frequency is within an ultra-high frequency (UHF) range of frequencies or a high-frequency (HF) range of frequencies.

4. The method of claim 1, further comprising:
   determining, via the processor, whether the one or more metal objects are RFID tags based on whether the difference between the first phase perturbation response and the second phase perturbation response is not significant;

presenting, via the processor, a first message via a display that the one or more metal objects have been cleared in response to determining the one or more metal objects are RFID tags; and presenting, via the processor, a second message via the display that there is likely an anomaly to be investigated in response to determining that there is likely a non-RFID metal object nearby.

5. The method of claim 4, wherein the anomaly corresponds to the at least one non-RFID metal object or errata.

6. The method of claim 1, further comprising:
transmitting, via the processor, an RFID message to cause nearby RFID tags to perform a write operation of data indicating that the nearby RFID tags have been cleared in response to determining the one or more metal objects are the RFID tags based on the RFID messages received on the monitored radio frequency; and transmitting, via the processor, a message to another device indicating that there is likely an anomaly to be investigated in response to determining the one or more metal objects includes the at least one non-RFID metal object based on the RFID messages received on the monitored radio frequency.

7. The method of claim 6, wherein the write operation of the data indicating the nearby RFID tags have been cleared causes the nearby RFID tags to store in memory a security code that is transmitted by the nearby RFID tags for use in future security screening operations by the metal-detecting RFID receiver device.

8. The method of claim 6, wherein the message is transmitted to the another device via a wireless communication protocol or using an Ethernet connection.

9. The method of claim 1, further comprising:
verifying, via the processor, an identifier from each of the received RFID messages, wherein the identifier is an Electronic Product Code (EPC) identifier.

10. The method of claim 9, wherein verifying, via the processor, the identifier from each of the received RFID messages comprises:
obtaining, via the processor, imagery of a person associated with a first RFID message from an imaging device; and
comparing, via the processor, the identifier within the received first RFID message to the obtained imagery.

11. The method of claim 1, further comprising:
determining, via the processor, whether the one or more metal objects are detected using a conventional metal detector functionality, and
wherein determining, via the processor, whether there are the one or more metal objects nearby using the monitored radio frequency comprises determining, via the processor, whether there are the one or more metal objects nearby using the monitored radio frequency in response to determining the one or more metal objects are detected using the conventional metal detector functionality.

12. The method of claim 1, further comprising:
presenting, via the processor, a message via a display indicating that there is likely an anomaly to be investigated in response to determining the difference is not significant.

13. The method of claim 1, further comprising:
determining, via the processor, whether the difference between the first phase perturbation response and the second phase perturbation response corresponds to a received valid RFID message in response to determining the difference is significant.

14. The method of claim 1, wherein the metal-detecting RFID receiver device is an RFID reader configured with metal-detecting capabilities.

15. A device, comprising:
a Radio Frequency Identification (RFID) receiver; and
a processor coupled to the metal-detecting RFID receiver and configured with processor-executable instructions to perform operations comprising:
monitoring a radio frequency;
determining whether there are one or more metal objects nearby using the monitored radio frequency by measuring a first phase perturbation response using the monitored radio frequency; and
determining, in response to determining there are one or more metal objects nearby, whether the one or more metal objects are RFID tags or include at least one non-RFID metal object by:
measuring a second phase perturbation response using a resonant frequency of RFID tags; and
determining whether there is likely a non-RFID metal object nearby based on whether a difference between the first phase perturbation response and the second phase perturbation response is significant.

16. The device of claim 15, wherein the processor is configured with processor-executable instructions to perform operations such that determining whether there are one or more metal objects nearby using the monitored radio frequency comprises:
monitoring a phase relationship between a current and a voltage at an RFID antenna for the monitored radio frequency; and
determining whether there is a phase shift that is greater than a predefined threshold for the monitored radio frequency based on the monitored phase relationship.

17. The device of claim 15, wherein the processor is configured with processor-executable instructions to perform operations further comprising:
determining whether the one or more metal objects are RFID tags based on whether the difference between the first phase perturbation response and the second phase perturbation response is not significant;
presenting a first message via a display that the one or more metal objects have been cleared in response to determining the one or more metal objects are RFID tags; and
presenting a second message via the display that there is likely an anomaly to be investigated in response to determining that there is likely a non-RFID metal object nearby.

18. The device of claim 15, wherein the processor is configured with processor-executable instructions to perform operations further comprising:
transmitting an RFID message to cause nearby RFID tags to perform a write operation of data indicating that the nearby RFID tags have been cleared in response to determining the one or more metal objects are the RFID tags based on the RFID messages received on the monitored radio frequency; and
transmitting a message to another device indicating that there is likely an anomaly to be investigated in response to determining the one or more metal objects includes the at least one non-RFID metal object based on the RFID messages received on the monitored radio frequency.

19. The device of claim 15, wherein the processor is configured with processor-executable instructions to perform operations further comprising:

determining whether the difference between the first phase perturbation response and the second phase perturbation response corresponds to a received valid RFID message in response to determining the difference is significant.

20. A non-transitory processor-readable storage medium having stored thereon processor-executable instructions configured to cause a processor of a metal-detecting Radio Frequency Identification (RFID) receiver device to perform operations comprising:

monitoring a radio frequency;

determining whether there are one or more metal objects nearby using the monitored radio frequency by measuring a first phase perturbation response using the monitored radio frequency; and determining, in response to determining there are one or more metal objects nearby, whether the one or more metal objects are RFID tags or include at least one non-RFID metal object based on RFID messages received on the monitored radio frequency by:

measuring a second phase perturbation response using a resonant frequency of RFID tags; and determining whether there is likely a non-RFID metal object nearby based on whether a difference between the first phase perturbation response and the second phase perturbation response is significant.

* * * * *